O. E. MALLORY.
Potato Digger.
No. 100,168. Patented Feb. 22, 1870.
Fig. I.
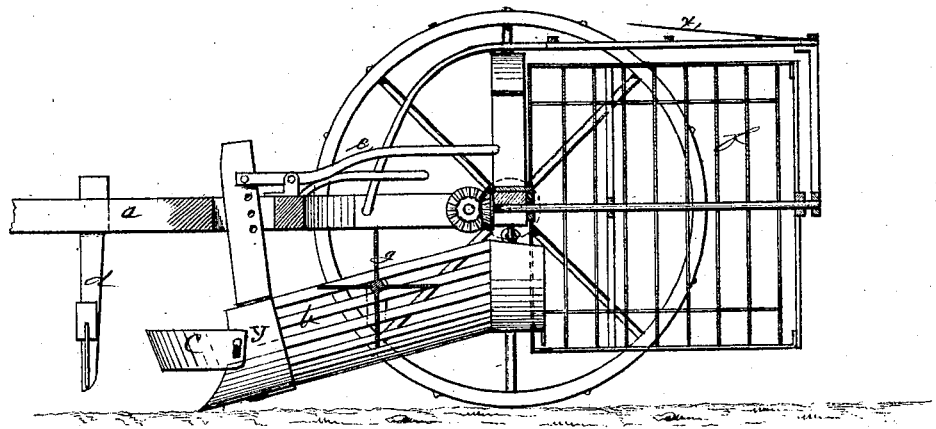
Fig. II.
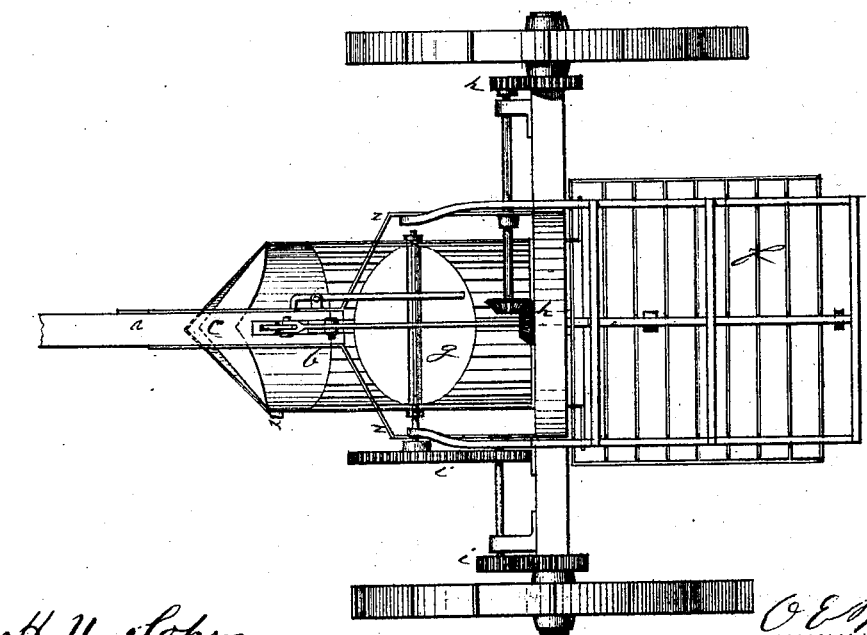

United States Patent Office.

ORSON E. MALLORY, OF BATAVIA, NEW YORK, ASSIGNOR FOR ONE-HALF HIS RIGHT TO SALMON B. LUSK, OF SAME PLACE.

Letters Patent No. 100,168, dated February 22, 1870.

IMPROVEMENT IN POTATO-DIGGER.

The Schedule referred to in these Letters Patent and making part of the same.

I, ORSON E. MALLORY, of Batavia, in the county of Genesee, and State of New York, have invented certain Improvements in a Potato-Digger, of which the following is a specification.

Nature and Object of the Invention.

My invention relates to the combination of the digging-apparatus with a revolving cylinder, made open so as to discharge the dirt through the open spaces, and permit the potatoes to be discharged at the end and to leave them upon the surface of the ground.

Description of the Accompanying Drawing.

Figure I is a side elevation of the potato-digger.
Figure II is a top view of the same.
Figure III is an end view of the same.

The machine has two wheels, arranged with lugs upon the periphery, and connected by an axle, to which the pole $a$ is attached, and with gearing on each wheel, which is operated by the revolution of the wheels, and is communicated to portions of the machine hereafter described.

The pole is attached to the axle by branching arms represented by letters $z\ z$, Fig. II.

The digging part of the machine is represented by letter $b$, and is attached by hooks to the under side of the axle and to the pole by an adjustable standard operated by levers $e$, and the rear part of said digger is made with open slats, the whole being in a scoop-form, and inside thereof is a paddle-wheel, with four arms in circular form at the ends to fit the inside shape of the digging part, which is operated by the gearing $i\ i$, arranged with one of the wheels of the machine, and this paddle-wheel is marked $g$, and serves to carry the potatoes which are dug and the dirt and other matter backward, and to deposit it in the cylinder in the rear.

I attach in front of the digging apparatus a double mold-board plow or scraper, marked $c$, which is located a little above the digger, and as it is operated in front thereof and above, it serves to remove the potato-tops and surface obstructions, and in order to do this more effectually, and not to injure the potatoes or disturb them, it is made adjustable where it is attached to the digger at letter $y$, Fig. II.

A colter, $d$, is attached to the pole in front of the machine, to aid in clearing obstructions, and is made with two tines, one on each side, as represented, the more effectually to throw aside stones and other small obstructions.

In the rear of the digging apparatus I attach an open revolving cylinder, from three to five feet long, made of strong wire, cage form, and close enough to hold the potatoes, and discharge the dirt underneath and the potatoes at the rear end on the top of the dirt.

It is arranged with the proper elevation at the front so as to receive the potatoes from the digger, and with a proper descent to discharge them. This cylinder is represented by letter $f$.

A frame-work extends backward, connected at the front with the pole-attachment, and resting in hooks or eyes on each side of the seat $o\ o$, elevated from the axle, so that the rear end of the axle of this cylinder is supported by this frame, and the forward end of the axle has a pawl-wheel attached, operating with and operated by gearing connected with the wheel of the machine, marked $h\ h$.

This cylinder is adjustable at the rear end by means of lever $x$, to aid in turning round or passing over uneven ground, as shown at letter $x$, Fig. I.

I have not particularly described dimensions nor material to be used, as ordinary mechanics would readily adapt both to the machine for the purposes described.

Having thus described my invention,
What I claim, is—

The combination of the adjustable digger $b$ with the revolving paddle-wheel $g$ and the adjustable clearer $c$ and the open revolving cylinder in the rear, substantially as described and for the purposes set forth.

O. E. MALLORY.

Witnesses:
W. T. BLISS,
H. U. SOPER.